(No Model.)
W. E. BALL.
HARVESTER CUTTER.
No. 499,953. Patented June 20, 1893.
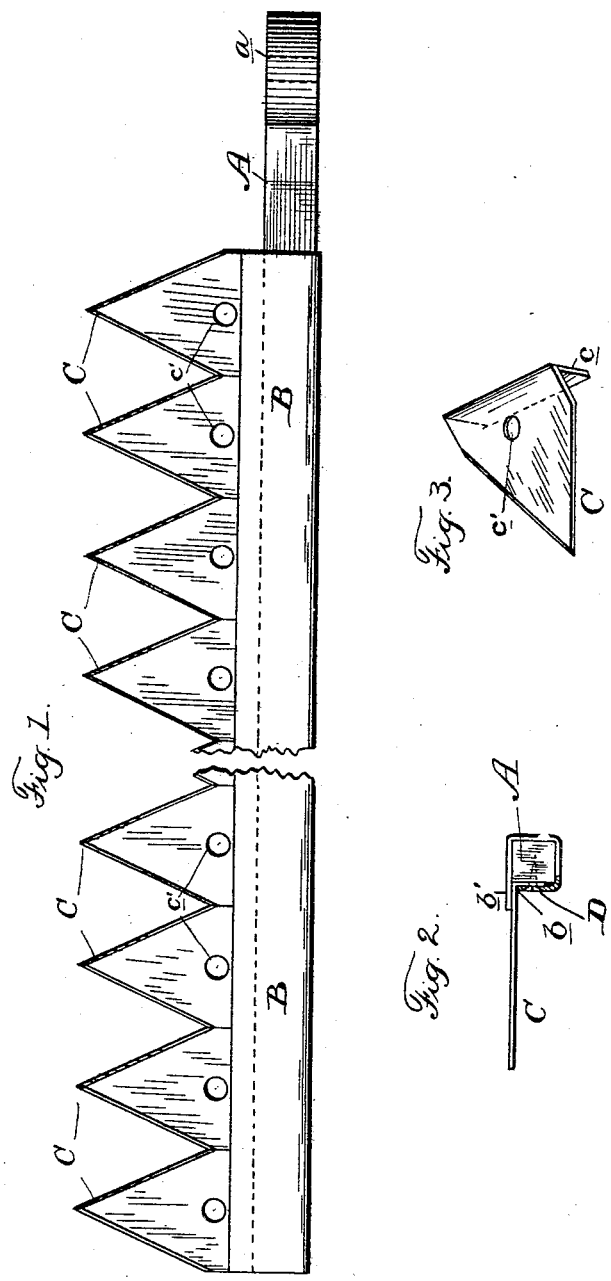
Witnesses
Thos. E. Robertson
W. E. Clendaniel
Inventor
William E. Ball,
By T. J. W. Robertson
Attorney

UNITED STATES PATENT OFFICE.

WILLIAM E. BALL, OF BRIDGEPORT, OHIO.

HARVESTER-CUTTER.

SPECIFICATION forming part of Letters Patent No. 499,953, dated June 20, 1893.

Application filed February 25, 1893. Serial No. 463,749. (No model.)

*To all whom it may concern:*

Be it known that I, WILLIAM E. BALL, a citizen of the United States of America, residing at Bridgeport, Belmont county, Ohio, have invented certain new and useful Improvements in Harvester-Cutters, of which the following is a specification, reference being had therein to the accompanying drawings.

This improvement relates to that class of cutters which are designed to be attached to a solid bar without rivets or screws and to be readily removed or replaced, and the invention consists in the peculiar construction, arrangement and combinations of parts hereinafter more particularly described and then definitely claimed.

In the accompanying drawings—Figure 1 represents a plan view of a cutter-bar and cutters constructed according to my improvement. Fig. 2 is an end view of the same, partly broken away. Fig. 3 is a perspective view of one of the cutters detached.

Referring now to the details of the drawings by letter—A represents the cutter-bar which is formed preferably square in cross section as represented in Fig. 2, and is provided with the ordinary eye *a* to connect it with the pitman by which it is driven. Surrounding this is a square tube or sleeve B open at *b* to allow of the insertion of the cutters C, each of which is provided with a turned down flange *c* fitting into the space between the front of the cutter bar and the tube, which latter has a lip *b'* that slightly overhangs the cutters, as shown at Fig. 2, to prevent them from rising out of place. The cutters have each a hole, as shown at *c'*, to allow of the insertion of a hook or other instrument by which they may be drawn out for grinding or other purposes. At the end of the bar is shown a screw D which prevents the cutters coming off when in use. By this construction, a cutter-bar and cutters are provided, which can be readily used with any of the ordinary finger or guard bars, and which will allow of the ready removal of the cutters should they require regrinding. As there are no holes in the body of the bar as usually required to fasten the cutters to it, the bar is much stronger than those commonly employed. I prefer to use the tube B in one piece, but it may be in two or more lengths if preferred by the maker. I also prefer to use a square bar and tube, as such will fit in the ordinary finger-bars commonly used, but I do not limit myself to this form, as other shaped bars may be used with good effect.

What I claim as new is—

1. The combination of a bar and a tube surrounding and secured to said bar, provided with an opening at one side, with a series of cutters having flanges fitting between the bar and tube, substantially as described.

2. The combination with a polygonal bar and a correspondingly shaped tube surrounding and secured to said bar, of a series of cutters having flanges fitting between the front of the bar and the inside of the tube, substantially as described.

3. The combination with a polygonal bar and a series of cutters having depending flanges, of a tube surrounding and secured to said bar and provided with an overhanging lip to keep the cutters in position, substantially as described.

4. The combination of the square cutter bar A, and the cutters C having depending flanges *c*, with the square tube B, having the opening *b* and overhanging lip *b'* for holding the cutters in place, and the screw D, all substantially as shown and described.

In testimony whereof I affix my signature, in presence of two witnesses, this 21st day of February, 1893.

WILLIAM E. BALL.

Witnesses:
JOHN TURNER,
C. W. HOWELL.